(12) United States Patent
Sawonski (10) Patent No.: US 11,590,885 B2
(45) Date of Patent: Feb. 28, 2023

(54) METHOD FOR THE OPERATION OF A SELF-DRIVING MOTOR VEHICLE

(71) Applicant: Ford Global Technologies, LLC, Dearborn, MI (US)

(72) Inventor: Anette Sawonski, Siegburg (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 310 days.

(21) Appl. No.: 16/781,095

(22) Filed: Feb. 4, 2020

(65) Prior Publication Data

US 2020/0254924 A1 Aug. 13, 2020

(30) Foreign Application Priority Data

Feb. 8, 2019 (DE) .......................... 102019201666.9

(51) Int. Cl.
| | |
|---|---|
| *G01C 22/00* | (2006.01) |
| *B60Q 1/34* | (2006.01) |
| *H05B 45/20* | (2020.01) |
| *H05B 45/10* | (2020.01) |
| *G05D 1/00* | (2006.01) |
| *G05D 1/02* | (2020.01) |

(52) U.S. Cl.
CPC .......... *B60Q 1/346* (2013.01); *G05D 1/0088* (2013.01); *G05D 1/0212* (2013.01); *H05B 45/10* (2020.01); *H05B 45/20* (2020.01); *B60Q 2400/20* (2013.01); *G05D 2201/0213* (2013.01)

(58) Field of Classification Search
CPC .... B60Q 1/346; B60Q 2400/20; H05B 45/20; H05B 45/10; G05D 1/0088; G05D 1/0212; G05D 2201/0213
See application file for complete search history.

(56) References Cited

U.S. PATENT DOCUMENTS

| | | | |
|---|---|---|---|
| 6,084,507 | A | 7/2000 | Butler et al. |
| 6,587,573 | B1 | 7/2003 | Stam et al. |
| 8,358,074 | B2 | 1/2013 | Biondo et al. |
| 9,039,261 | B2 | 5/2015 | Fujiu et al. |

(Continued)

FOREIGN PATENT DOCUMENTS

| | | |
|---|---|---|
| CN | 203472784 U | 3/2014 |
| CN | 206136392 U | 4/2017 |

(Continued)

OTHER PUBLICATIONS

German Search Report dated Jun. 27, 2019 re DE Appl. No. 102019201666.9 (Non-English).

(Continued)

*Primary Examiner* — Adam M Alharbi
(74) *Attorney, Agent, or Firm* — Frank A. MacKenzie; Bejin Bieneman PLC (57) ABSTRACT

A method and a system can include receiving travel direction information representing a planned driving maneuver of the motor vehicle, detecting at least one road user in a path region of the planned driving maneuver based on an evaluation of at least the travel direction information, determining a lamp operation data set for operating at least one lamp of the motor vehicle based on the evaluation of at least the travel direction information when a road user is detected in the path region, and operating the lamp in accordance with the lamp operation data set.

15 Claims, 5 Drawing Sheets

(56) References Cited

U.S. PATENT DOCUMENTS

| | | | |
|---|---|---|---|
| 9,481,287 B2 | 11/2016 | Marti et al. | |
| 9,771,021 B1 | 9/2017 | Lindsay | |
| 9,970,623 B2 | 5/2018 | Henige et al. | |
| 10,134,280 B1 | 11/2018 | You | |
| 2010/0296285 A1* | 11/2010 | Chemel | F21V 21/00 |
| | | | 362/249.1 |
| 2011/0098898 A1 | 4/2011 | Stahlin et al. | |
| 2012/0044090 A1 | 2/2012 | Kahler et al. | |
| 2012/0206050 A1* | 8/2012 | Spero | F21V 19/02 |
| | | | 315/152 |
| 2013/0335212 A1 | 12/2013 | Purks et al. | |
| 2014/0247160 A1 | 9/2014 | Glascock | |
| 2015/0012200 A1 | 1/2015 | Joshi et al. | |
| 2015/0058127 A1 | 2/2015 | Abuelsaad et al. | |
| 2015/0154863 A1 | 6/2015 | Fossier et al. | |
| 2015/0203023 A1 | 7/2015 | Marti et al. | |
| 2015/0379872 A1 | 12/2015 | Al-Qaneei | |
| 2017/0011628 A1 | 1/2017 | Rios Cortes | |
| 2017/0050558 A1 | 2/2017 | Salter et al. | |
| 2017/0120804 A1* | 5/2017 | Kentley | B60Q 1/0035 |
| 2017/0256167 A1 | 9/2017 | Kim et al. | |
| 2018/0004020 A1 | 1/2018 | Kunii et al. | |
| 2018/0082587 A1 | 3/2018 | Wan et al. | |
| 2018/0297470 A1 | 10/2018 | Kim | |

FOREIGN PATENT DOCUMENTS

| | | | | |
|---|---|---|---|---|
| CN | 109997057 A | * | 7/2019 | B60Q 1/0023 |
| DE | 102011051152 A1 | | 12/2012 | |
| DE | 102013214481 A1 | | 1/2015 | |
| DE | 102014011811 A1 | | 2/2016 | |
| DE | 102014016334 A1 | | 5/2016 | |
| DE | 102014226254 A1 | | 6/2016 | |
| KR | 1020170001677 A | | 1/2017 | |
| MX | PA02009331 A | | 3/2004 | |
| WO | 2014181025 A1 | | 11/2014 | |
| WO | 2018021063 A1 | | 2/2018 | |

OTHER PUBLICATIONS

Final Office Action dated Nov. 5, 2019 re U.S. Appl. No. 15/683,045.
Non-Final Office Action dated Jan. 15, 2019 re U.S. Appl. No. 15/683,017.
Non-Final Office Action dated Dec. 11, 2019 re U.S. Appl. No. 15/683,017.
Non-Final Office Action dated Jun. 24, 2019 re U.S. Appl. No. 15/683,045.
Non-Final Office Action dated Feb. 6, 2018 re U.S. Appl. No. 15/682,983.
Notice of Allowance dated Oct. 15, 2018 re U.S. Appl. No. 15/682,983.
Pena-Garcia et al., "Effects of Daytime Running Lamps on pedestrians visual reaction time: implications on vehicles and human factors", "2014 ISSST", 2014 International Symposium on Safety Science and Technology, Peer-rhttp://creatieviewv under recommons. oresponsibility of scig/licenses/by-nc-nd/3.0/entific comm.

* cited by examiner

METHOD FOR THE OPERATION OF A SELF-DRIVING MOTOR VEHICLE

CROSS-REFERENCE TO RELATED APPLICATION

This patent application claims priority to German Application No. DE 102019201666.9 filed on Feb. 8, 2019, which is hereby incorporated by reference in its entirety.

TECHNICAL FIELD

The present disclosure relates to operating a self-driving motor vehicle.

BACKGROUND

Self-driving motor vehicles (sometimes also called autonomous land vehicles) are motor vehicles which can drive, steer and park without the influence of a human driver (highly automated driving or autonomous driving). The term robot car is also used in cases where no manual control by a driver is necessary. The driver's seat can remain unoccupied; it is possible that no steering wheel, brake or accelerator pedals are present.

With the aid of various sensors, self-driving motor vehicles can acquire their environment and determine their position and those of other road users from the information obtained, drive to a destination by communicating with a navigation software, and avoid collisions on the way there.

Such self-driving motor vehicles must be able to communicate with their surroundings, in particular with other road users such as, for example, pedestrians. A lighting system for a self-driving motor vehicle is, for example, known from WO 2018/021063 A1, wherein light parameters are changed upon the detection of a road user in order in that way to inform the pedestrian that he has been detected by the self-driving motor vehicle.

No information is, however, made available as to the direction in which the self-driving motor vehicle will continue its travel.

SUMMARY

The present disclosure comprises a method and a system for the operation of a self-driving motor vehicle that includes:
  reading in travel direction information representing a planned driving maneuver of the motor vehicle,
  detecting at least one road user in the path region of the planned driving maneuver, with evaluation of at least the travel direction information,
  determining a lamp operation data set for the operation of at least one lamp of the motor vehicle with the evaluation of at least the travel direction information when a road user is detected in the path region, and
  operating the lamp in accordance with the lamp operation data set.

The lamp can comprise a plurality of individually operable light sources such as, for example, LEDs, which can be operated using the lamp operation data set individually and/or in groups and/or all at once. Within the framework of the determination of the lamp operation data set, the travel direction information that has been acquired is encoded in accordance with a predetermined code. Encoded travel direction information relating to a planned driving maneuver of the motor vehicle is thus reproduced through the operation of the lamp according to the lamp operation data set. Other road users such as, for example, pedestrians are thus informed about planned driving maneuvers of the self-driving motor vehicle. In that the presence of a road user in the path region of the planned driving maneuver is detected, and that only then is the lamp operation data set generated, reaction to road users who are not involved is avoided. Other road users such as, for example, pedestrians, can thus be informed about planned driving maneuvers of the self-driving motor vehicle in accordance with need, without additional lighting equipment such as further lamps being necessary for this purpose.

According to an example implementation, a luminous intensity is specified by the lamp operation data set. The light sources of the lamp which, for example, are operable individually, can thus output light of different luminous intensity. Warning signals, for example, for other road users such as, for example, pedestrians, can thus be generated.

According to an example implementation, a lamp sequence is specified by the lamp operation data set. The light sources of the lamp which, for example, are operable individually can be activated individually and/or in groups in a predetermined temporal sequence. Time-variable lamp sequences of this sort can particularly easily be perceived by other road users such as, for example, pedestrians.

According to an example implementation, a lighting direction is specified by the lamp operation data set. The light sources of the lamp which, for example, are operable individually can be activated individually and/or in groups in a predetermined temporal sequence. The individual light sources can here have different orientations, i.e. they emit light in different directions. A position of a detected road user such as, for example, a pedestrian, can thus be taken into consideration in that, for example, light is emitted in the direction of the detected road user such as, for example, the pedestrian. The perceptibility can thus be further improved.

According to an example implementation, a lighting color is specified by the lamp operation data set. The light sources of the lamp which, for example, are operable individually can be arranged individually and/or in groups behind (in the direction of light propagation) a colored lens, while other operable light sources are located behind a lens that is not colored. The light color can be changed through the activation of the operable light sources behind the colored lens. The perceptibility can thus again be further improved.

The present disclosure can also include a computer program, a control device, and a motor vehicle with a control device.

DETAILED DESCRIPTION

Figure 1:
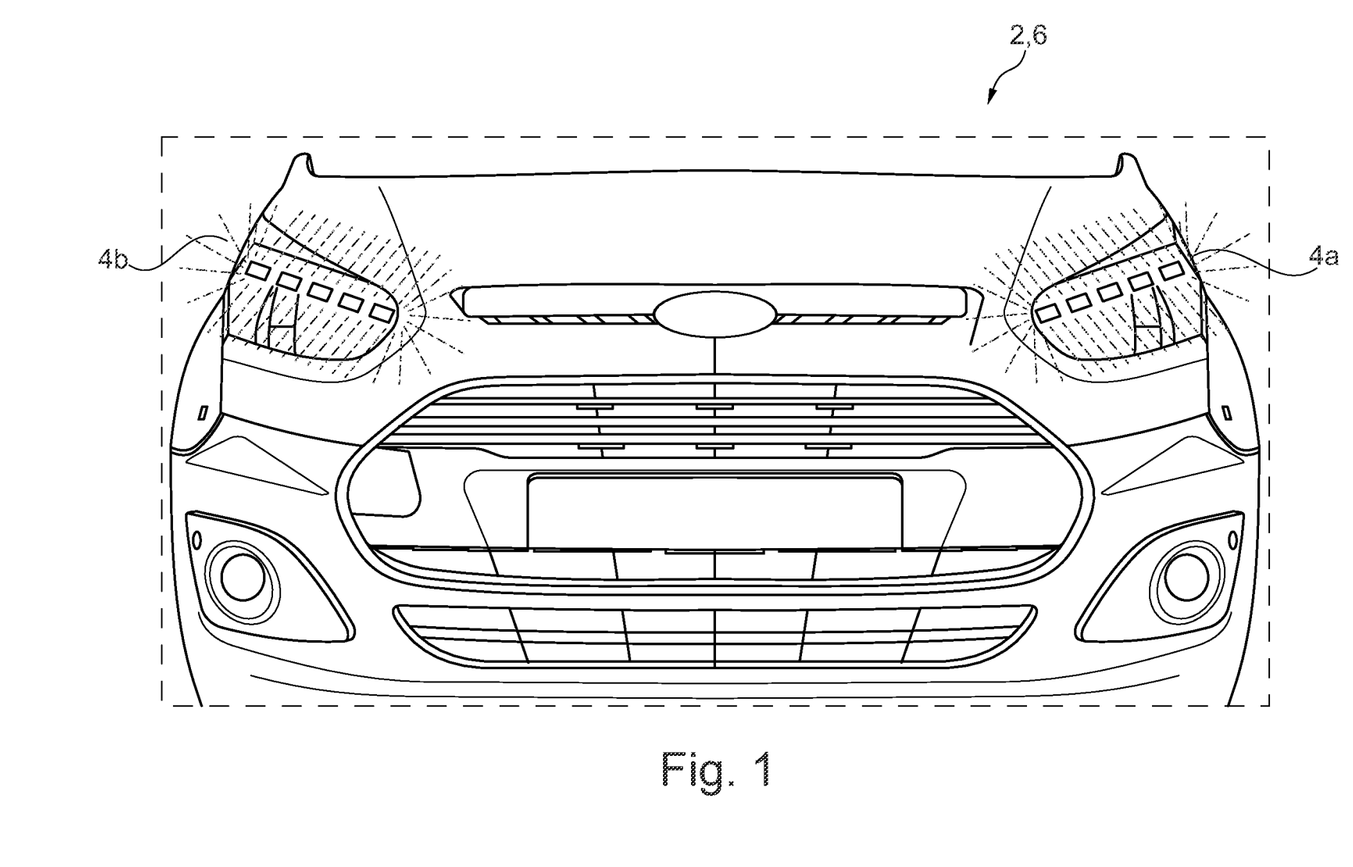
FIG. 1 shows a schematic illustration of a front view of a motor vehicle.

Reference is first made to FIG. 1.

A motor vehicle 2, which in the present implementation may be an automobile, is illustrated. In the present implementation, the motor vehicle 2 is furthermore designed as a self-driving motor vehicle which can drive, steer and park without the intervention of a human driver. The motor vehicle 2 comprises various surroundings sensors for acquiring the environment for this purpose, and can determine its position and those of other road users from the information obtained, drive to a destination by communicating with a navigation software, and avoid collisions on the way there.

The motor vehicle 2 comprises a vehicle lighting system. Vehicle lighting system refers to lighting devices of motor vehicles that are necessary in order to be seen at dusk, in darkness or under bad weather conditions.

The vehicle lighting system comprises two lamps 4a, 4b which, in the example implementation, provide a high beam, low beam, side light and daytime running light. The vehicle lighting system can in addition also comprise a parking light and/or a cornering light and/or fog lamps. In the illustration shown in FIG. 1, the lamps 4a, 4b provide a daytime running light with a reduced luminous intensity.

The lights 4a, 4b each comprise a plurality of individually operable light sources 12 (see FIG. 4) which can—as will be explained in more detail later—be operated individually and/or in groups and/or altogether. In the present case the light sources 12 are LEDs. In other words the lamps 4a, 4b in the example implementation are each designed as electrically operated LED headlamps (also known as matrix LED headlamps), that are operated by a control device 6. The control device 6 can comprise hardware and/or software components for this purpose and for the tasks and/or functions described below.

Figure 2:
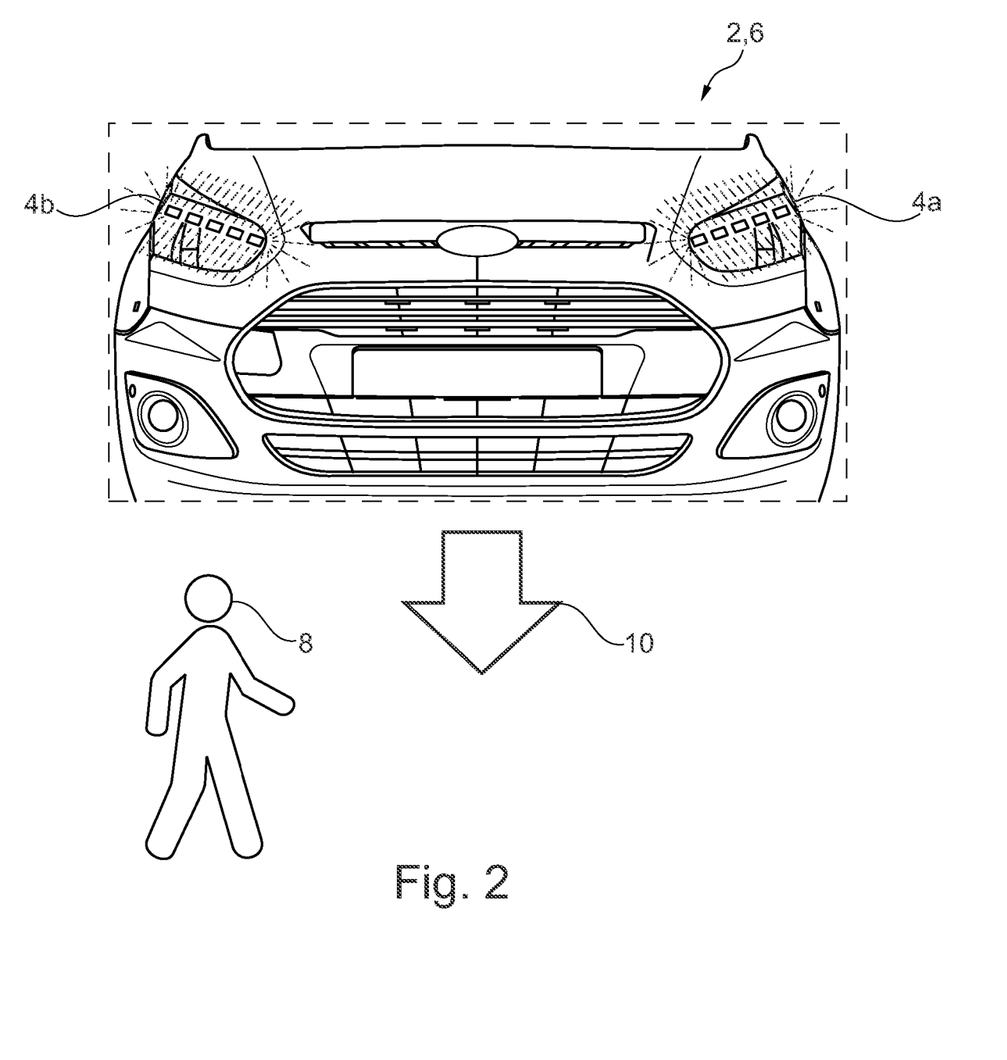
FIG. 2 shows a schematic illustration of a traffic scenario with a further road user.

Reference is now also made to FIG. 2.

A traffic scenario is illustrated in which a road user 8, a pedestrian in the example implementation, crosses a path region 10 of a planned driving maneuver of the motor vehicle 2.

The control device 6 is designed to read in travel direction information FRI (see FIG. 5) representing a planned driving maneuver of the motor vehicle 2 and to determine the path region 10. The control device 6 is furthermore designed to evaluate sensor data of the surroundings sensors in order to determine whether the road user 8 is located in the path region 10.

If a road user 8 is detected in the path region 10, the control device 6 determines a lamp operation data set LAD (see FIG. 5) for the operation of one or both lamps 4a, 4b of the motor vehicle 2, with at least an evaluation of the travel direction information FRI.

Within the framework of the determination of the lamp operation data set LAD, the travel direction information FRI that has been read in is here encoded in accordance with a predetermined code. The lamp operation data set LAD in other words contains information representing the planned driving maneuver of the motor vehicle 2 along which it will move through the path region 10.

The control device 6 then operates the lamps 4a, 4b in accordance with the lamp operation data set LAD. Encoded travel direction information FRI relating to a planned driving maneuver of the motor vehicle 2 is thus reproduced through the operation of the lamps 4a, 4b according to the lamp operation data set LAD.

The encoded travel direction information FRI can, for example, be reproduced in that a luminous intensity of the lamps 4a, 4b is changed. The light sources 12 of the lamps 4a, 4b which, for example, are operable individually, can thus output light of different luminous intensity. It can, for example, be provided, as illustrated in FIG. 2, that all the light sources 12 are operated together with a maximum luminous intensity when a road user 8 is detected in the path region 10, in order in this way to inform the road user 8 that he is located in a hazardous region. If, on the other hand, there is no road user 8 in the path region 10, the light sources 12 are operated with a reduced luminous intensity, for example as a daytime running light.

In addition or as an alternative, the encoded travel direction information FRI can, for example, be reproduced in that a lamp sequence of the lamps 4a, 4b is changed. The light sources 12 of the lamps 4a, 4b are activated for this purpose individually and/or in groups in a predetermined temporal sequence. Direction information relating to the planned driving maneuver can in this way, for example, be reproduced in accordance with the travel direction information FRI. A lamp sequence running from right to left can, for example, symbolize turning to the left. Lamp sequences can also, for example, symbolize the motor vehicle 2 being stationary.

In addition or as an alternative, the encoded travel direction information FRI can, for example, be reproduced in that a lamp direction of the lamps 4a, 4b is changed. The light sources 12 of the lamps 4a, 4b are activated for this purpose individually and/or in groups in a predetermined temporal sequence. Individual light sources 12 here have different orientations, i.e. they emit light in different directions. A position of the detected road user 8 can thus be taken into consideration in that light is emitted in the direction of the detected road user 8. Direction information relating to the planned driving maneuver can, for example, in this way also however be reproduced in accordance with the travel direction information FRI.

Figure 3:
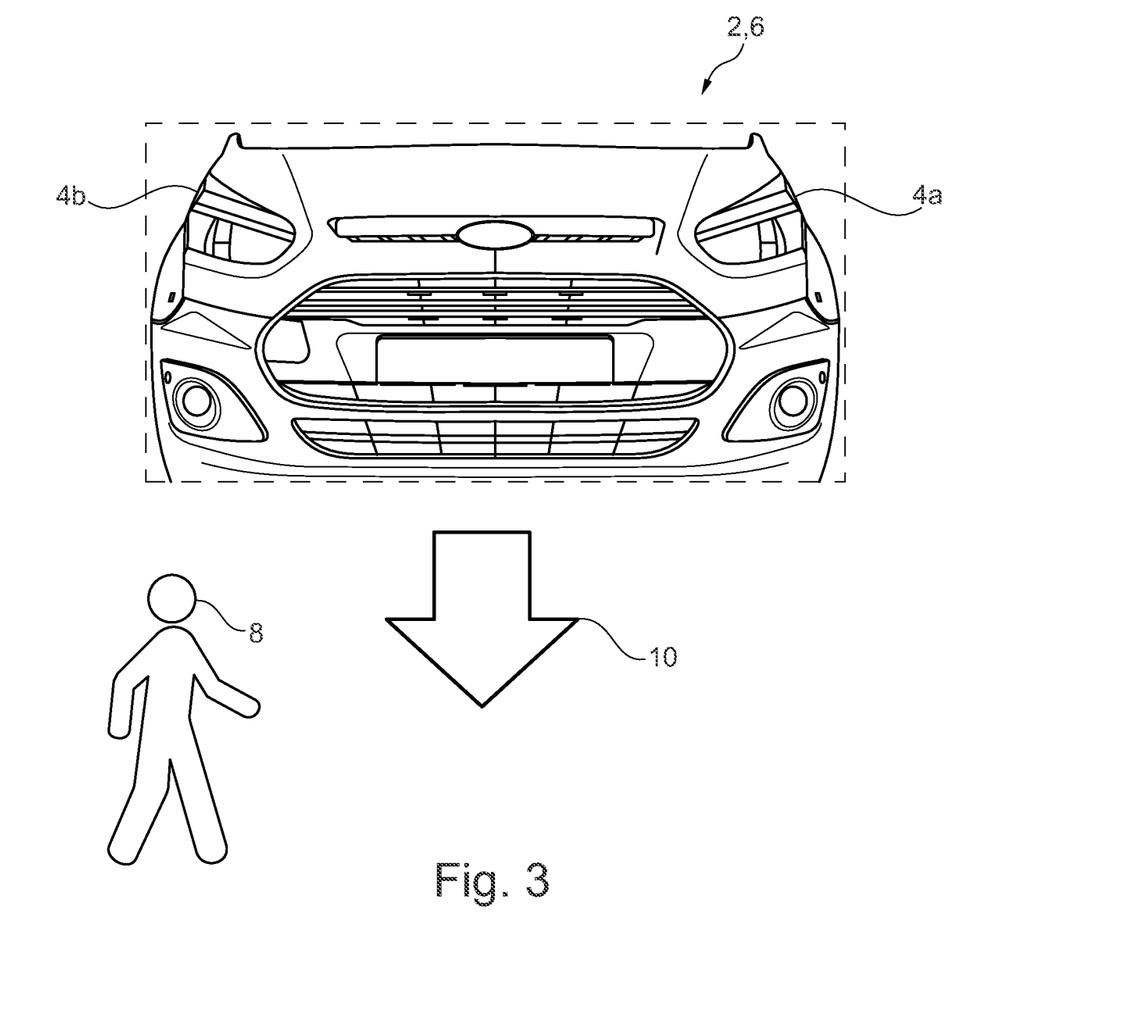
FIG. 3 shows a schematic illustration of a further traffic scenario with a further road user.

Reference is now also made to FIG. 3.

In addition or as an alternative, the encoded travel direction information FRI can, for example, be reproduced in that a lamp color of the lamps 4a, 4b is changed.

Figure 4:
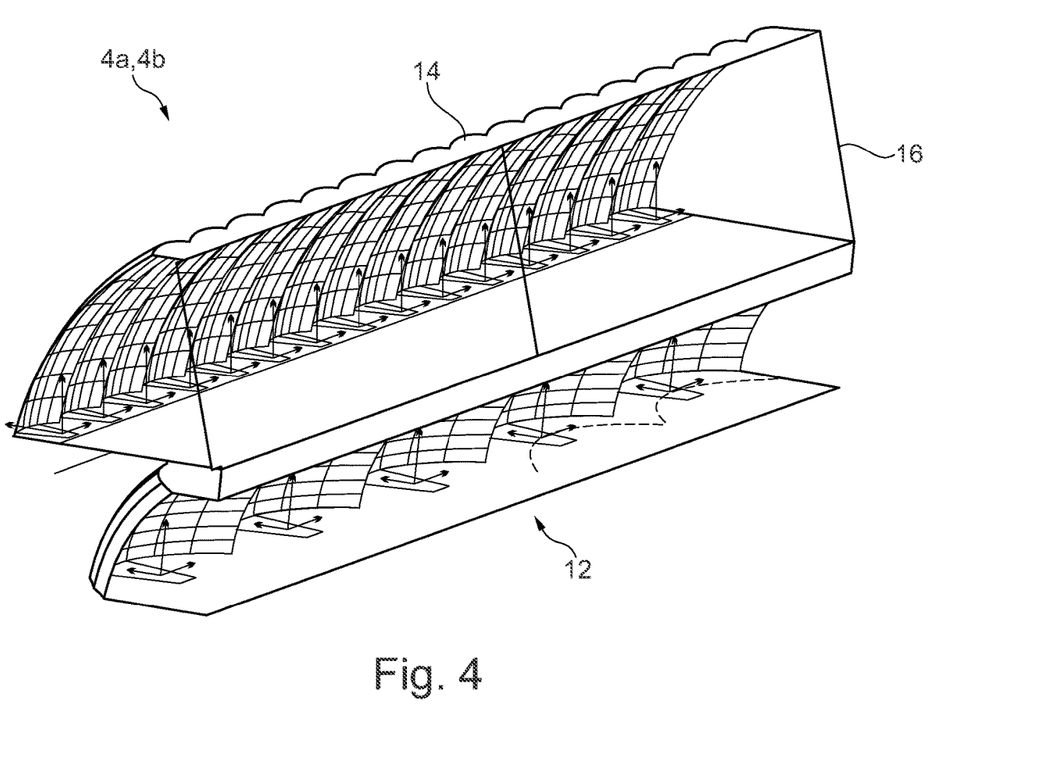
FIG. 4 shows a schematic illustration of a lamp of the motor vehicle shown in FIG. 1.

Reference is now also made to FIG. 4, in order to explain the structure of the lamps 4a, 4b.

The lamps 4a, 4b are illustrated. They contain a plurality of light sources 12 which, in the example implementation, are LEDs.

Reflectors 14 which have the effect of diverging the light and expanding the beam of the light emitted from the respective light source 12 are assigned to the light sources 12.

A lens 16 that consists of an optically transparent but colored material is arranged behind the reflectors 14 (in the direction of light propagation). The material has a turquoise coloring in the example implementation, so that light emerging through the lens 16 has a turquoise coloration. The light color be changed through the activation of the light sources 12 behind the colored lens 16.

Figure 5:
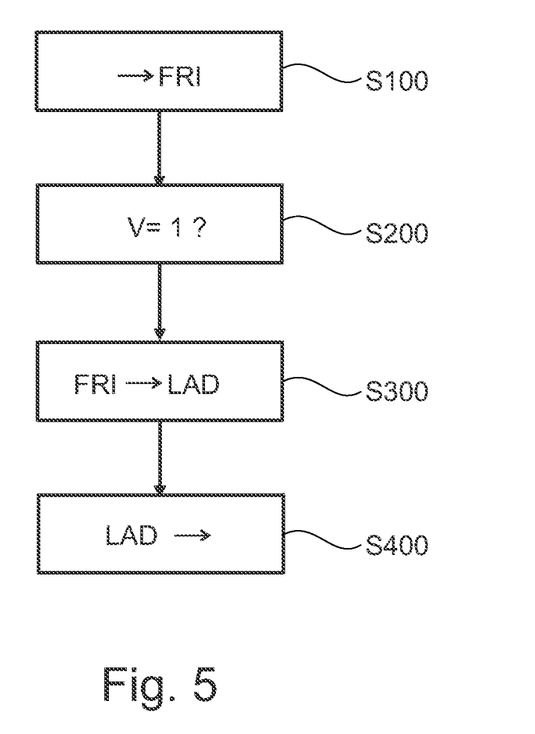
FIG. 5 shows a schematic illustration of a process flow for the operation of the motor vehicle shown in FIGS. 1 to 3.

A process flow for the operation of the motor vehicle 2 is now explained with additional reference to FIG. 5.

In a first step S100, the control device 6 reads in the travel direction information FRI representing the planned driving maneuver of the motor vehicle 2. The path region 10 is determined on the basis of the travel direction information FRI.

In a further step S200, by evaluating sensor data of the surroundings sensors of the motor vehicle 2, a determination is made as to whether the road user 8 is located in the path region 10 through which the motor vehicle 2 will move according to the planned driving maneuver. If the road user 8 is located in the path region 10, the value of logical one is assigned to a logical variable V. Otherwise the value of logical zero is assigned to the logical variable V.

The control device 6 reads in the logical variable V and, in a further step S300, determines the lamp operation data set LAD for operation of the lamps 4a, 4b of the motor vehicle 2 if a road user 8 is detected in the path region 10, i.e. the logical variable V has the value of logical one. The control device 6 evaluates the travel direction information FRI as well as, if relevant, a detected position of the road user 8 in order to determine the lamp operation data set LAD with which the luminous intensity and/or lamp sequence and/or lighting direction and/or lighting color of the lamps 4a, 4b or of their light sources 12 can be specified.

In a further step S400, the lamps 4a, 4b or their light sources 12 are then operated by the control device 6 in accordance with the lamp operation data set LAD.

In some implementations, the sequence of the steps can also be different. Multiple steps can, furthermore, also be carried out at the same time, i.e. simultaneously.

Other road users 8 such as, for example, pedestrians, can thus be informed about planned driving maneuvers of the motor vehicle 2 in accordance with need, without additional lighting equipment such as further lamps being necessary for this purpose.

LIST OF REFERENCE SIGNS

2 Motor vehicle
4a Lamp
4b Lamp
6 Control device
8 Road user
10 Path region
12 Light source
14 Reflector
16 Lens
FRI Travel direction information
LAD Lamp operation data set
V Logical variable

The invention claimed is:

1. A method comprising:
receiving travel direction information representing a planned driving maneuver of a motor vehicle;
detecting at least one road user in a path region of the planned driving maneuver based on an evaluation of at least the travel direction information;
determining a lamp operation data set for operating at least one lamp of the motor vehicle based on the evaluation of at least the travel direction information when a road user is detected in the path region; and
operating the at least one lamp in accordance with the lamp operation data set, including activating the lamp according to an encoding of the travel direction information that indicates the planned driving maneuver including at least one of (a) a direction the vehicle will turn or (b) the vehicle being stationary.

2. The method as recited in claim 1, wherein operating the at least one lamp further comprises modifying a luminous intensity of the at least one lamp, wherein the luminous intensity is specified by the lamp operation data set based on the encoding.

3. The method as recited in claim 1, wherein operating the at least one lamp further comprises modifying a lamp sequence of the at least one lamp, wherein the at least one lamp sequence is specified by the lamp operation data set based on the encoding.

4. The method as recited in claim 1, wherein operating the at least one lamp further comprises modifying a lighting direction of the at least one lamp, wherein the lighting direction is specified by the lamp operation data set based on the encoding.

5. The method as recited in claim 1, wherein operating the at least one lamp further comprises modifying a lighting color of the at least one lamp, wherein the lighting color is specified by the lamp operation data set based on the encoding.

6. A system comprising:
a control device that includes software executable by the control device such that the control device is programmed to:
receive travel direction information representing a planned driving maneuver of a motor vehicle;
detect at least one road user in a path region of the planned driving maneuver based on an evaluation of at least the travel direction information;
determine a lamp operation data set for operating at least one lamp of the motor vehicle based on the evaluation of at least the travel direction information when a road user is detected in the path region; and
operate the at least one lamp in accordance with the lamp operation data set, including activating the lamp according to an encoding of the travel direction information that indicates the planned driving maneuver including at least one of (a) a direction the vehicle will turn or (b) the vehicle being stationary.

7. The system as recited in claim 6, wherein the control device is programmed to operate the at least one lamp by modifying a luminous intensity of the at least one lamp, wherein the luminous intensity is specified by the lamp operation data set based on the encoding.

8. The system as recited in claim 6, wherein the control device is programmed to operate the at least one lamp by modifying a lamp sequence of the at least one lamp, wherein the at least one lamp sequence is specified by the lamp operation data set based on the encoding.

9. The system as recited in claim 6, wherein the control device is programmed to operate the at least one lamp by modifying a lighting direction of the at least one lamp, wherein the lighting direction is specified by the lamp operation data set based on the encoding.

10. The system as recited in claim 6, wherein the control device is programmed to operate the at least one lamp by modifying a lighting color of the at least one lamp, wherein the lighting color is specified by the lamp operation data set based on the encoding.

11. An autonomous vehicle comprising:
a control device that includes software executable by the control device such that the control device is programmed to:
receive travel direction information representing a planned driving maneuver of the autonomous vehicle;
detect at least one road user in a path region of the planned driving maneuver based on an evaluation of at least the travel direction information;
determine a lamp operation data set for operating at least one lamp of the autonomous vehicle based on the evaluation of at least the travel direction information when a road user is detected in the path region; and
operate the at least one lamp in accordance with the lamp operation data set, including activating the lamp according to an encoding of the travel direction information that indicates the planned driving maneuver including at least one of (a) a direction the vehicle will turn or (b) the vehicle being stationary.

12. The autonomous vehicle as recited in claim 11, wherein the control device is programmed to operate the at least one lamp by modifying a luminous intensity of the at least one lamp, wherein the luminous intensity is specified by the lamp operation data set based on the encoding.

13. The autonomous vehicle as recited in claim 11, wherein the control device is programmed to operate the at least one lamp by modifying a lamp sequence of the at least one lamp, wherein the at least one lamp sequence is specified by the lamp operation data set based on the encoding.

14. The autonomous vehicle as recited in claim 11, wherein the control device is programmed to operate the at least one lamp by modifying a lighting direction of the at least one lamp, wherein the lighting direction is specified by the lamp operation data set based on the encoding.

15. The autonomous vehicle as recited in claim 11, wherein the control device is programmed to operate the at least one lamp by modifying a lighting color of the at least one lamp, wherein the lighting color is specified by the lamp operation data set based on the encoding.

\* \* \* \* \*